(12) United States Patent
Kim (10) Patent No.: US 7,349,801 B2
(45) Date of Patent: Mar. 25, 2008

(54) VEHICLE NAVIGATION SYSTEM AND METHOD FOR GUIDING PATH OF COMPLEX INTERSECTION

(75) Inventor: Hyoung Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 10/678,381

(22) Filed: Oct. 3, 2003

(65) Prior Publication Data

US 2004/0068369 A1    Apr. 8, 2004

(30) Foreign Application Priority Data

Oct. 4, 2002    (KR) ...................... 10-2002-0060708

(51) Int. Cl.
*G01C 21/30* (2006.01)
*G01C 21/32* (2006.01)

(52) U.S. Cl. ...................... 701/209; 701/210; 701/211; 340/995.14; 340/995.22; 340/995.2

(58) Field of Classification Search ................ 701/209, 701/210, 211; 340/995.22, 995.14, 995.2
See application file for complete search history.

(56) References Cited

U.S. PATENT DOCUMENTS

| 5,787,382 | A   | * | 7/1998 | Kurabayashi ................ 701/214 |
| 6,184,823 | B1  | * | 2/2001 | Smith et al. ............ 342/357.13 |
| 6,424,911 | B2  | * | 7/2002 | Yamashita et al. ........... 701/208 |
| 2004/0162672 | A1 | * | 8/2004 | Kim ........................... 701/209 |

* cited by examiner

*Primary Examiner*—Thomas Black
*Assistant Examiner*—Marie A Weiskopf
(74) *Attorney, Agent, or Firm*—Lee, Hong, Degerman, Kang & Schmadeka (57) ABSTRACT

There is provided a vehicle navigation system and method for guiding path of a complex intersection more accurately. The method for guiding path of the complex intersection includes the steps of: configuring the complex intersection through a grouping based on a terminal sharing node and link extracted from a path searching data; performing a patterning to reconfigure the complex intersection; performing a map matching and a path following during a drive state based on a reconstructed data; and providing the followed path guidance information to a user.

15 Claims, 9 Drawing Sheets

Related Art

Example of single intersection:
One intersection configured with one node

Example of complex intersection:
One intersection configured with plurality of node Fig.1
Related Art Example of single intersection:
One intersection configured
with one node Example of complex intersection:
One intersection configured
with plurality of node Fig.2
Related Art

P-turn path of complex intersection

Fig. 10

VEHICLE NAVIGATION SYSTEM AND METHOD FOR GUIDING PATH OF COMPLEX INTERSECTION

BACKGROUND OF THE INVENTION

1. Field of the Invention

The present invention relates to a vehicle navigation system, and more particularly, to a method for guiding path of a complex intersection.

2. Description of the Related Art

A vehicle navigation system is an equipment that calculates paths in order to guide a vehicle to a driver's intended destination and provides a drive instruction to the driver in consideration of current vehicle position and drive direction such that the vehicle is driven along the calculated path.

A global positioning system (GPS) recently employed in a vehicle navigation system is a satellite navigation system that is originally developed by the Department of Defense. The satellite navigation system receives a radio wave signal generated from three or four satellites in which an atomic frequency is loaded, calculates a distance to the satellite using a propagation time of the received radio wave signal, and measures a speed using three (or two) dimensional determination and a Doppler effect of radio wave.

The navigation system is originally developed for a military purpose. Afterwards, considering a utility value of private transport means, the navigation system transmits radio wave signals having a distance error from satellites so that civilians can use it.

Accordingly, an information used for vehicle movement, such as distance and time to destination, can be obtained using the GPS satellite signal.

According to the vehicle navigation system using the GPS, when a satellite radio wave signal is inputted through a GPS directional antenna mounted outside the vehicle, an information on latitude and longitude is outputted by a GPS tuner.

The information is processed in a central processing unit together with wheel rotation signal and data inputted through various sensors of the vehicle, and an arrival expectation time is calculated, and the result value is displayed on a display device.

Typical vehicle navigation systems are classified into a path searching scheme and a path guiding scheme. The path searching scheme can be implemented with two methods. One method is to calculate path within a vehicle by using only geographic information and position information which are loaded in the vehicle. The other method is to receive an information calculated by a remote server through a transmission of a vehicle position information.

As the path guiding scheme, there are a turn by turn method of providing a drive information for path following and a method of providing a surrounding geographic information together with a path instruction in a drive state.

Here, according to the path searching scheme, a method of receiving the information calculated by the remote server through the transmission of the vehicle position information can include various information, such as real time traffic information, in a path selection. However, there is a limit that all path guidable information is dependent on a reception from a server. Additionally, in case the method of receiving the information calculated by the server through the transmission of the vehicle position information is applied, the method of instructing the drive information for path following can be used together in the path guiding scheme because the vehicle does not have the path surrounding geographic information.

In general, a conventional vehicle navigation system uses a method of displaying a surrounding map and providing a surrounding geographic information together with a path indication in order for a map searching, in which a surrounding information of a navigation numeric map is directly displayed to the user to thereby provide an intersection information.

In case such an intersection information is guided to the user, the method of receiving the information calculated by the server and the method of instructing the drive information for path following have a limit that an intersection guidance must be performed using a guidance indication because the methods do not display the surrounding map.

At this time, although a path guidance time point and a guiding scheme maintains the conventional method, a judgment standard must be precisely defined in order to display the corresponding intersection on a screen to provide the drive instruction, not the surrounding map information.

Figure 1:
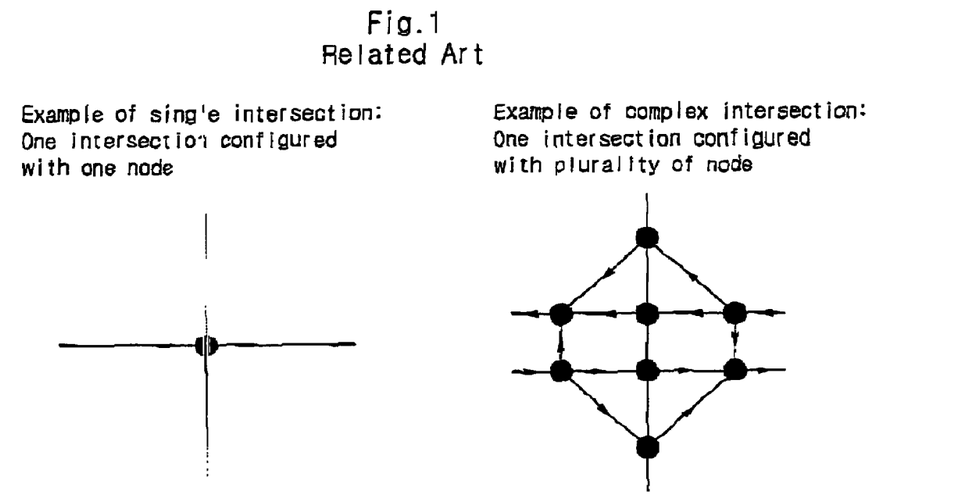
FIG. 1 is a view exemplarily showing a representation of an intersection.

FIG. 1 is a view exemplarily showing a representation of an intersection. As shown in FIG. 1, an intersection that a driver generally judges as one intersection is represented with a road network of a navigation numeric map. The intersections are classified into two types. One is a single intersection configured with one node, and the other is a complex intersection configured with a plurality of nodes although the driver may judge it as one intersection. Here, the complex intersection can be represented differently according to passage network inside the intersection, geographic factors, types of an adjacent supplementary road network incorporated into an actual intersection, and so on.

Since the representation of the single intersection assumes the display of the surrounding map, a judgment standard for conditions of the complex intersection is not reflected. Therefore, only an icon of a rotation instruction is displayed auxiliarily.

However, in case of the turn by turn scheme, it is difficult to transmit information appropriate to the drive guidance by using a rotation icon since there is no method except for a method for displaying conditions of adjacent roads through an intersection pattern.

Figure 2:
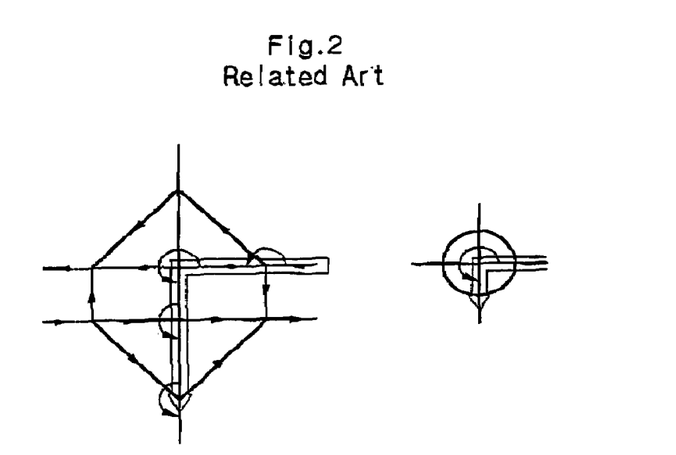
FIG. 2 is a schematic view of a screen guiding paths of a complex intersection according to a related art.

FIG. 2 is a schematic view of a screen that guides paths of a complex intersection according to a related art. As shown in FIG. 2, the complex intersection is configured to be applicable to a map format standardized for a configuration of a complex intersection information. However, in case of an application of an actual guidance, a generation standard of an actual complex intersection node is unsuitable for a representation of one intersection since a broad area, not a rotary intersection which is an actual guidance target, is grouped.

Additionally, the complex intersection has a single position information and a cost by representing a supernode with one representative node, and includes an internal road network as an attribute. In other words, the supernode is also used for a path searching and guidance as one node. On the contrary, a vehicle navigation system of communication-based turn-by-turn scheme stores the searching path received from a server in a type of node/link sequence, instead of the navigation numeric map recorded on CD/DVD containing a large capacity geographic information, and uses it for the path guidance. Accordingly, there is a difficulty in extracting the searching path, which is configured with a general node and link, and the guidance data by dividing the supernode in order to apply only the representation of the path guidance.

SUMMARY OF THE INVENTION

Accordingly, the present invention is directed to a vehicle navigation system and method that substantially obviates one or more problems due to limitations and disadvantages of the related art.

It is an object of the present invention to provide a vehicle navigation system and method for guiding paths more accurately by reconfiguring a complex intersection which cannot be represented with one node on a navigation numeric map.

Additionally advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to a preferred embodiment of the present invention, a vehicle navigation method for guiding path of a complex intersection comprises the steps of: generating a node and a link sequence from a path searching data; extracting a terminal sharing node and link by comparing the node and link sequence with a map for terminal; reconstructing a path guidance data of the complex intersection by using the extracted sharing node and link; performing a map matching and a path following during a drive state on the basis of the reconstructed data; and providing the followed path guidance information to a user.

The step of reconstructing the path guidance data comprises the steps of: performing a grouping by using the sharing node and link of the complex intersection; and patterning the grouped complex intersection.

According to another preferred embodiment of the present invention, a vehicle navigation apparatus for guiding path of complex intersection comprises: means for generating a node and a link sequence from a path searching data; means for extracting a terminal sharing node and link by comparing the node and link sequence with a map for terminal; means for reconstructing a path guidance data of the complex intersection by using the extracted sharing node and link; means for performing a map matching and a path following during a drive state on the basis of the reconstructed data; and means for providing the followed path guidance information to a user.

According to further another preferred embodiment of the present invention, a vehicle navigation system comprises: a server for transmitting path data searched from a remote geographic/traffic information; means for receiving the searched path data from the server; means for receiving an information on a current vehicle position from a GPS satellite; means for extracting a drive information of the vehicle by using the received information on the vehicle position; a storage means having a geographic information stored therein; a path searching means for searching the geographic information stored in the storage means; and a guiding means for reconstructing path guidance data of the complex intersection by using the path data provided from the server and the path searching means to thereby perform a path guidance and provide a path information.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the attached drawings.

Figure 3:
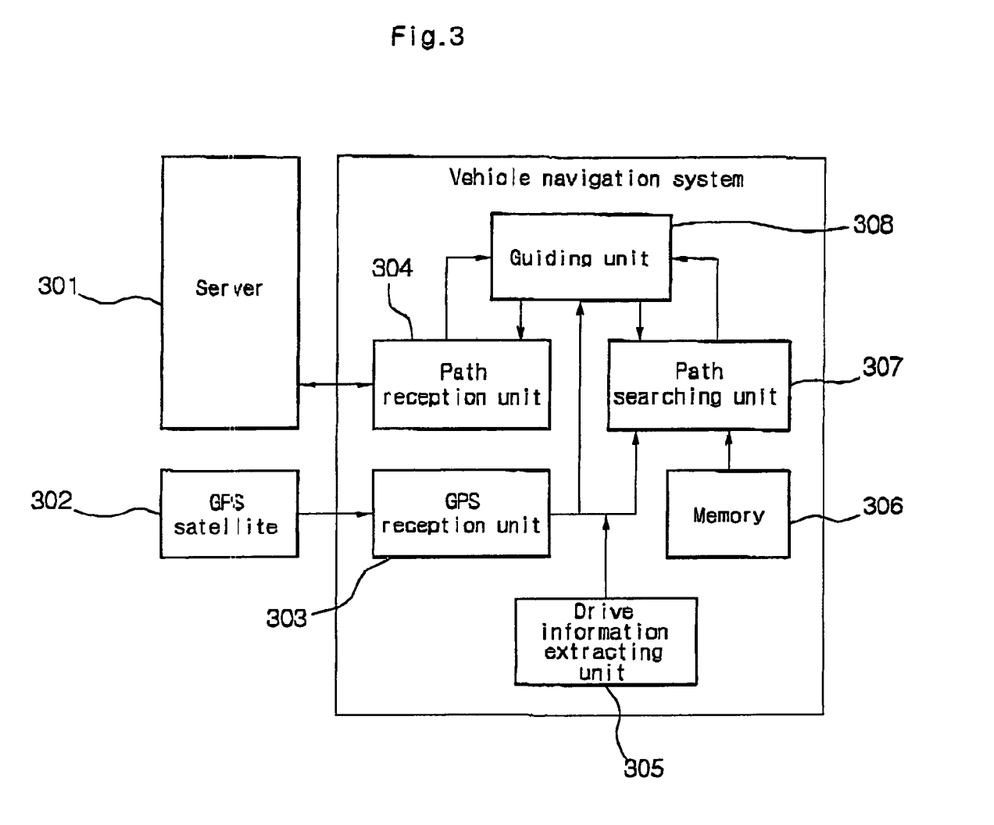
FIG. 3 is a schematic view of a vehicle navigation system for guiding a path of a complex intersection according to the present invention.

FIG. 3 is a view schematically showing a construction of a vehicle navigation system for guiding a path of a complex intersection according to the present invention. Referring to FIG. 3, the vehicle navigation system includes: a server 301 for transmitting path data searched from a remote geographic/traffic information; a path reception unit 304 for receiving the searched path data from the server 301; a GPS reception unit 303 for receiving an information on a current vehicle position from a GPS satellite 302; a drive information extracting unit 305 for extracting a drive information of the vehicle by using the received information on the vehicle position; a memory 306 having a geographic information stored therein; a path searching unit 307 for searching the geographic information stored in the memory 306; and a guiding unit 308 for reconstructing path guidance data of the complex intersection by using the path data provided from the server 301 and the path searching unit 307 to thereby perform a path guidance and provide a path information.

A method for guiding the vehicle at the complex intersection by using the vehicle navigation system constructed as above will be described below. Here, it is assumed that an attribute and accuracy of a navigation numeric map has an integrity secured within an allowable range.

Figure 4:
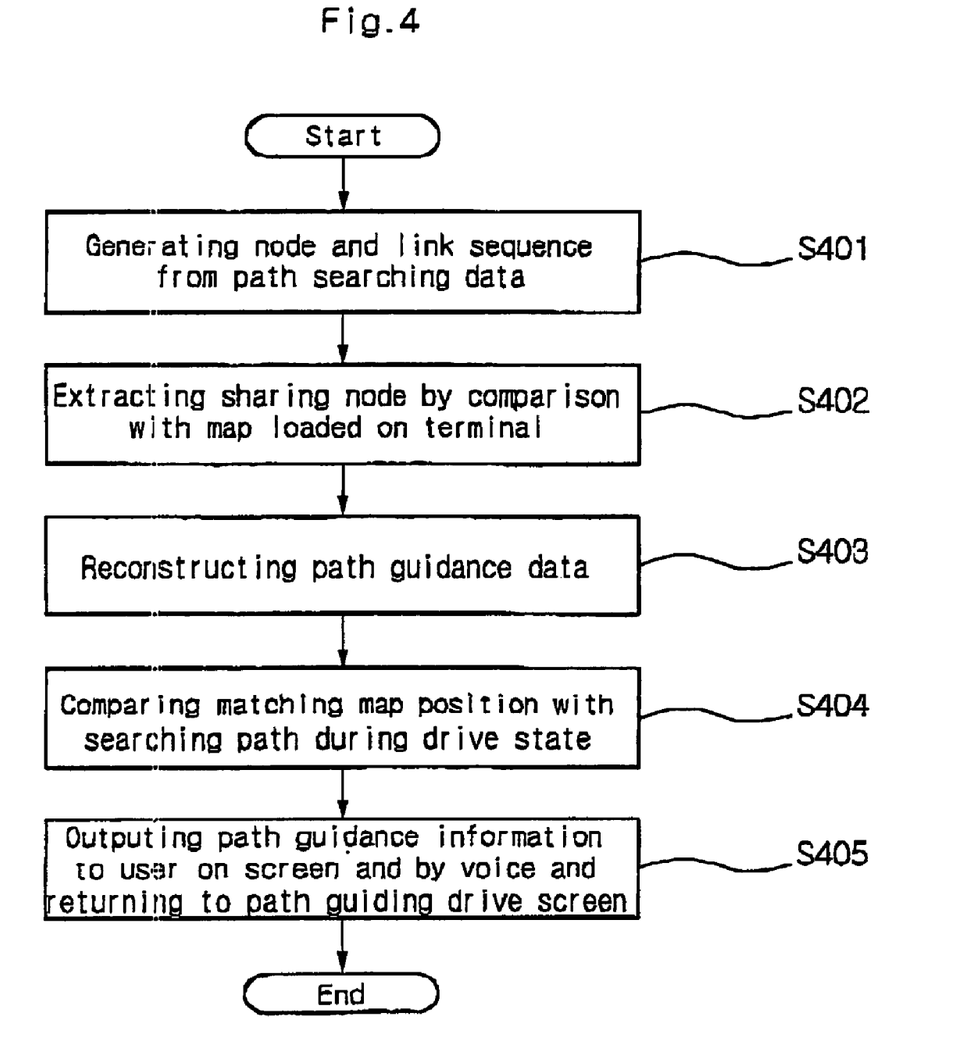
FIG. 4 is a flowchart showing a vehicle navigation guiding method for guiding a path of a complex intersection according to the present invention.

FIG. 4 is a flowchart showing a vehicle navigation guiding method for guiding a path of a complex intersection according to the present invention. Referring to FIG. 4, a node and a link sequence are generated from a path searching data (S401). Here, the path searching data can be provided from the external server 301 or a self system, specifically the path searching unit 307.

For example, in case the path searching data provided from the server 301 is used, the node and the link can be generated through a parsing of the received path searching data.

On the contrary, in case the path searching data provided from the path searching unit 307 is used, the node and the link sequence can be generated from a path searching result itself without any additional parsing process because a searching target is the same node and link.

Then, the node and the link sequence are compared with a map for a terminal use to extract terminal sharing node and link (S402).

A path guidance data of the complex intersection is reconstructed using the extracted sharing node and link (S403).

Here, the reconstruction of the path guidance data means the reconstruction of the node and link data of the complex intersection. In other words, the reconstruction of the path guidance data means that a grouping is performed using the sharing node and link of the complex intersection and then the grouped complex intersection is patterned.

First, the complex intersection used in the present invention will be described.

In general, when a driver sees with a naked eye, the complex intersection may be judged as one intersection. However, there may occur many cases that one intersection is configured with several nodes in order to secure inter link traffic regulation and link connectivity in a process of creating a navigation numeric map for the vehicle navigation system. The intersection configured with one or more nodes is defined as the complex intersection. A typical type of the complex intersection is a crossroad intersection (i.e., a radial intersection) including a small-sized ramp for a right turn. Meanwhile, an intersection configured with three or more connection link at one node is defined as a simple intersection.

Such a complex intersection can be extracted in a general navigation numeric map. At this time, a conception of a basic extraction method is to create a navigation numeric map so that an intersection configuration link which is not classified as an actual road network can have the same attribute. Here, since the present invention is a technology that is applied to a local intersection judgment, it is different from a conventional method for extracting a ramp attribute reference, which is configured with a combination of branch links with respect to main link.

There are two methods for judging the complex intersection through a grouping process. One is to judge the complex intersection through a grouping process using the sharing node extracted at the step S402, and the other is to judge the complex intersection through a grouping process using the link extracted at the step S402.

The complex intersection judging method using the extracted sharing node includes the steps of: defining complex intersection configuration nodes of the navigation numeric map; grouping the extracted sharing nodes by using the defined intersection name attribute; and judging the complex intersect as a nodeset if a connectivity between the grouped nodes is secured. Here, each node of the complex intersection can be defined to have the same name according to the intersection name attribute. Additionally, the corresponding intersection name can be defined as a unique one within a national map.

On the contrary, The complex intersection judging method using the extracted link includes the steps of: defining complex intersection configuration links of the navigation numeric map; grouping the extracted links by using the intra-intersection link attribute; and judging a link, which is not the intra-intersection link among the grouped link, as a connection link.

Figure 5:
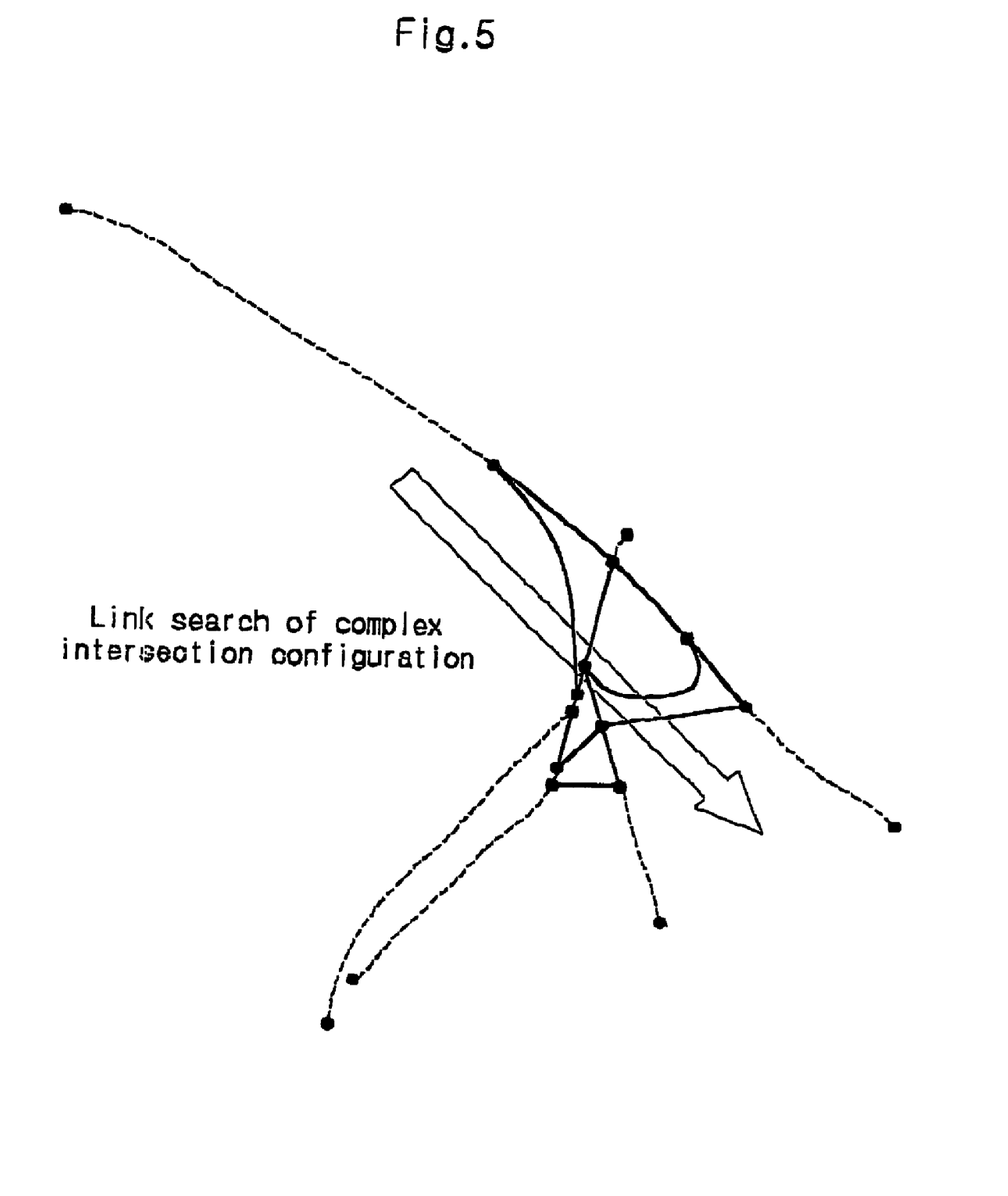
FIG. 5 is a view exemplarily showing an application of a grouping of a complex intersection according to the present invention.

FIG. 5 is a view exemplarily showing an application of the grouping of the complex intersection according to the present invention. FIG. 5 illustrates an application of the complex intersection grouped by an actual complex intersection configuration according to the method using the intra-intersection link attribute according to the present invention. As shown, the complex intersection is configured by the grouping, so that a connectivity with respect to the same attribute of adjacent links can be secured.

If the complex intersection is configured through the grouping, the node and link of the complex intersection configured as above is patterned through a simplifying process in order for an application to the path guidance screen configuration.

Figure 6:
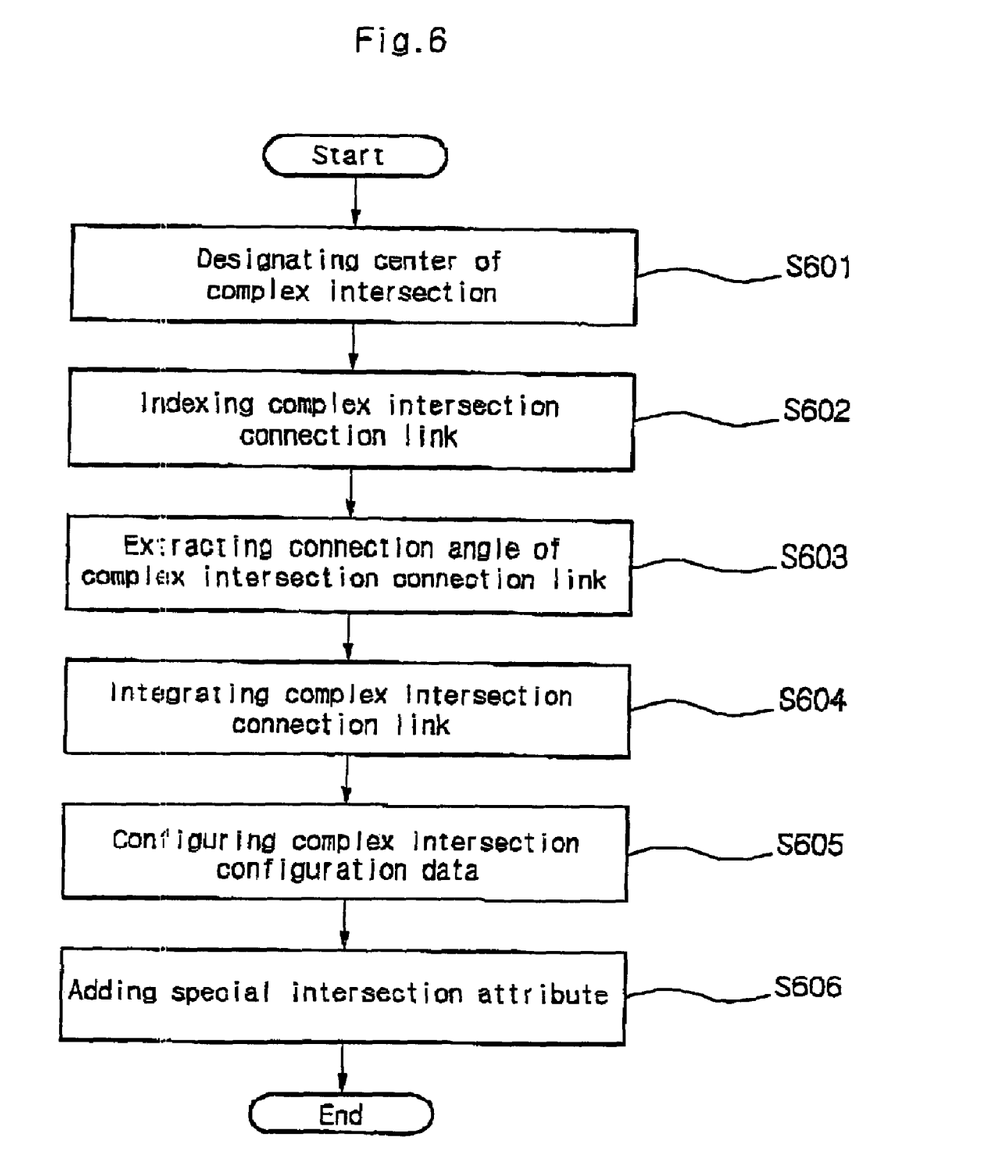
FIG. 6 is a flowchart showing a method for generating a complex intersection pattern according to the present invention.

FIG. 6 is a flowchart showing a method for generating the complex intersection pattern according to the present invention. Referring to FIG. 6, the center of the complex intersection configuration node extracted by the grouping is designated as the center of the complex intersection (S601). Here, an actual pattern can be managed as an additional information since it is independent of a position of a navigation numeric map.

Then, the complex intersection configuration node connected to the link that is judged as the connection link of the complex intersection is indexed in a clockwise (or counterclockwise) direction in reference of due north direction with respect to the center of the complex intersection (S602).

A connection angle of the connection link connected to a progressing direction of the indexed node is extracted (S603). Here, if the connection angle is not included in the attribute of the navigation numeric map, the connection angle can be calculated using a node coordinate, an initial pattern point coordinate of a progressing direction from the node to an outside of the complex intersection, and a vector inner product calculated from a vector coordinate of a due north direction. Additionally, the connection angle can be extracted from the path searching data attribute that is received from the terminal map or the server.

Then, the complex intersection connection links are integrated using the extracted connection angle (S604). Examples of the integrated links are shown in FIG. 7.

Figure 7:
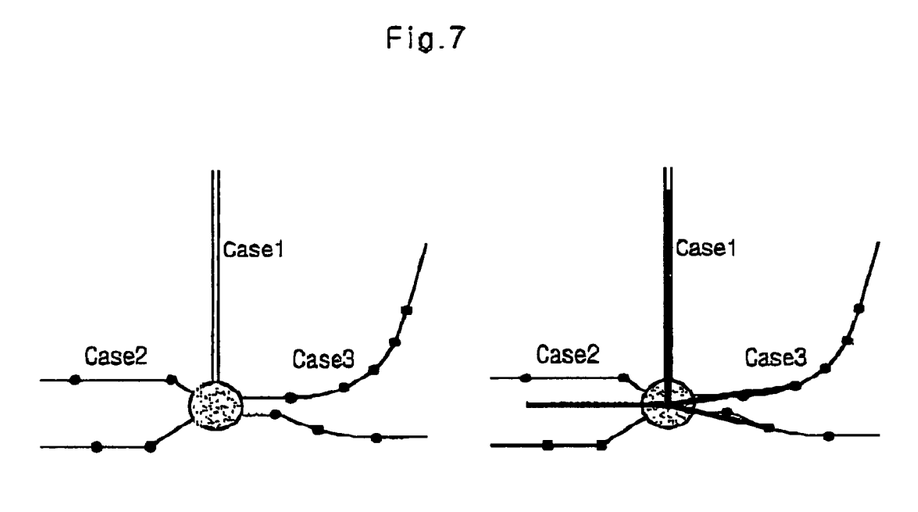
FIG. 7 is a view schematically showing examples of an integration between adjacent links of a complex intersection connection link according to the present invention.

FIG. 7 is a view schematically showing examples of the integration between adjacent links of the complex intersection connection link according to the present invention. In general, in case there are two or more complex intersection connection links with respect to the indexed adjacent link, there is a strong possibility of the same road on the screen configuration of the geographic information. Accordingly, like a pair of one-way roads (case 1) which is capable of passing in an opposite direction arranged in parallel due to a division of two-way road, if a traffic regulation of the link is one-way road and the links have less than 5° in a difference between the connection angles, they are integrated by an average of angle and the intersection pattern configured with the one-way road is generated. Additionally, like a pair of roads (case 2) in which an angle of a first pattern point is not in parallel and an angle of a second pattern point is in parallel, if there are two or more complex intersection connection links with respect to the corresponding node and an angle (connection angle) of the second pattern point in a node progressing direction is less than 5° in difference even at different links, the corresponding links can be defined as links divided on a topology or a road network and then integrated.

On the contrary, in the case of a pair of roads (case 3) in which an angel of the first pattern point is in parallel and a progressing direction after the second pattern point is different, each link itself is patterned without any integrating process.

Then, a complex intersection configuration data is constructed (S605).

Figure 8:
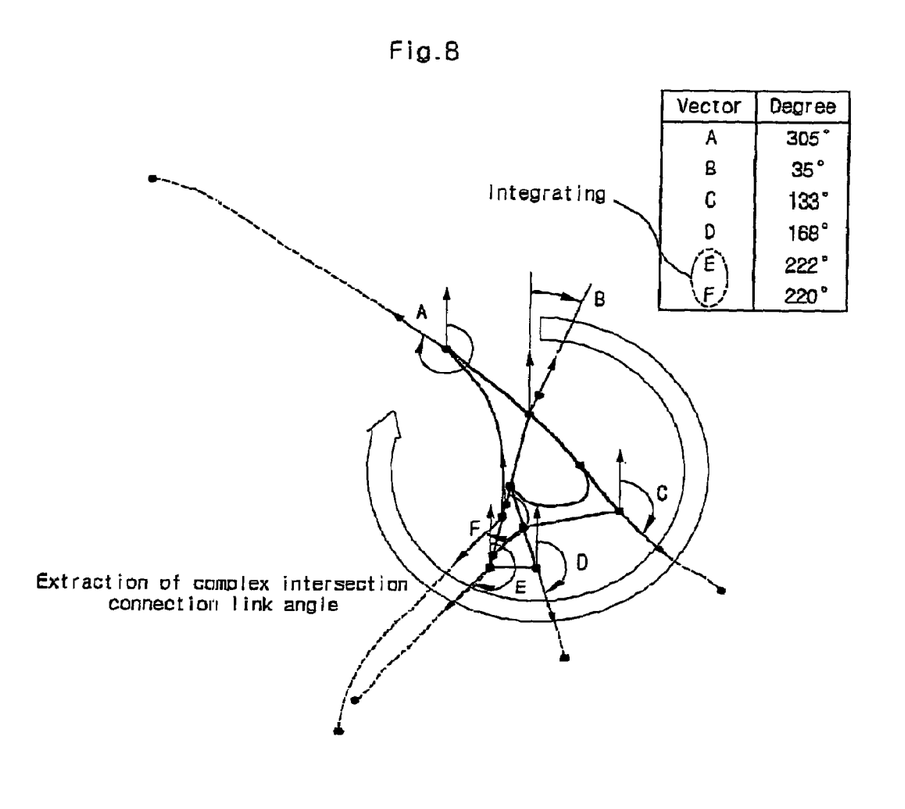
FIG. 8 is an exemplary view schematically showing a construction of a complex intersection configuration data according to the present invention.

FIG. 8 is an exemplary view schematically showing the construction of the complex intersection configuration data according to the present invention. Referring to FIG. 8, in case a difference of a connection angle of adjacent links is less than 5°, the links are integrated in the same manner according to an indexing rule. Here, the connectivity with respect to an entry/exit of the connection link of the complex intersection is secured even when the links are integrated by the link angle and represented as a single road.

Then, a special intersection attribute is added to the integrated complex intersection (S606).

Figure 9:
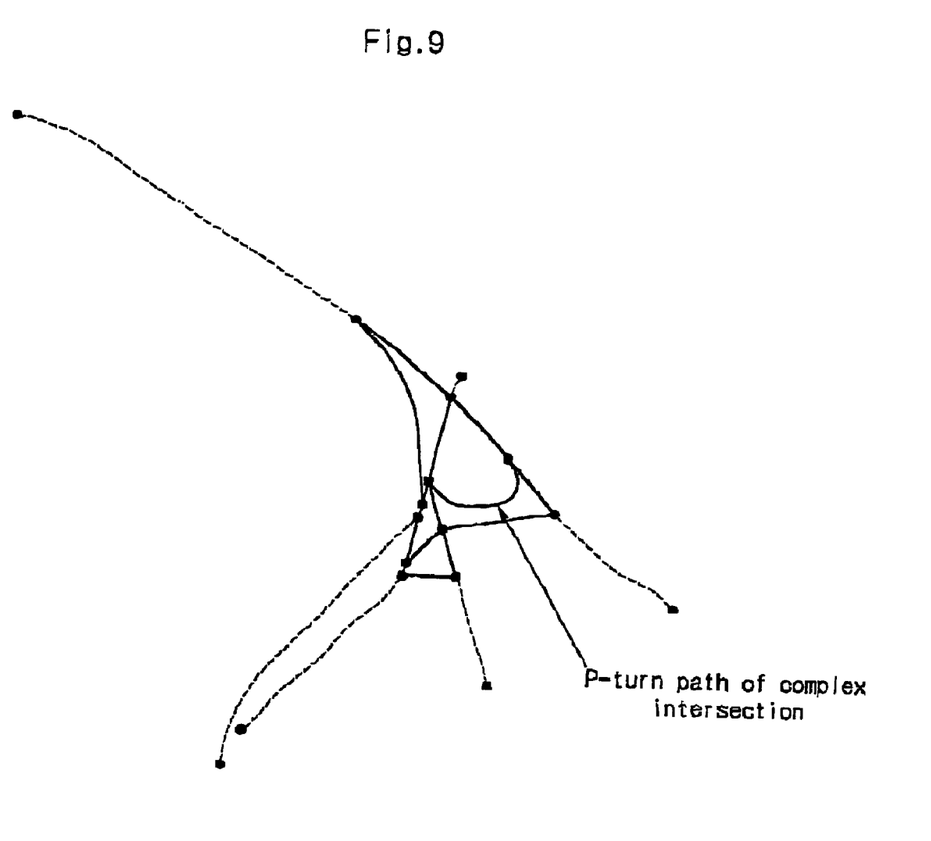
FIG. 9 is an exemplary view schematically showing an addition of a special intersection attrition according to the present invention.

FIG. 9 is an exemplary view schematically showing the addition of the special intersection attrition according to the present invention. As shown in FIG. 9, in case a P-turn path exists within the complex intersection, or in case a corresponding complex intersection is a rotary intersection in a classification of the intersection name, the center of the intersection is represented by a circular rotary.

The data reconstruction with respect to the complex intersection is completed by adding the special intersection attribute.

Figure 10:
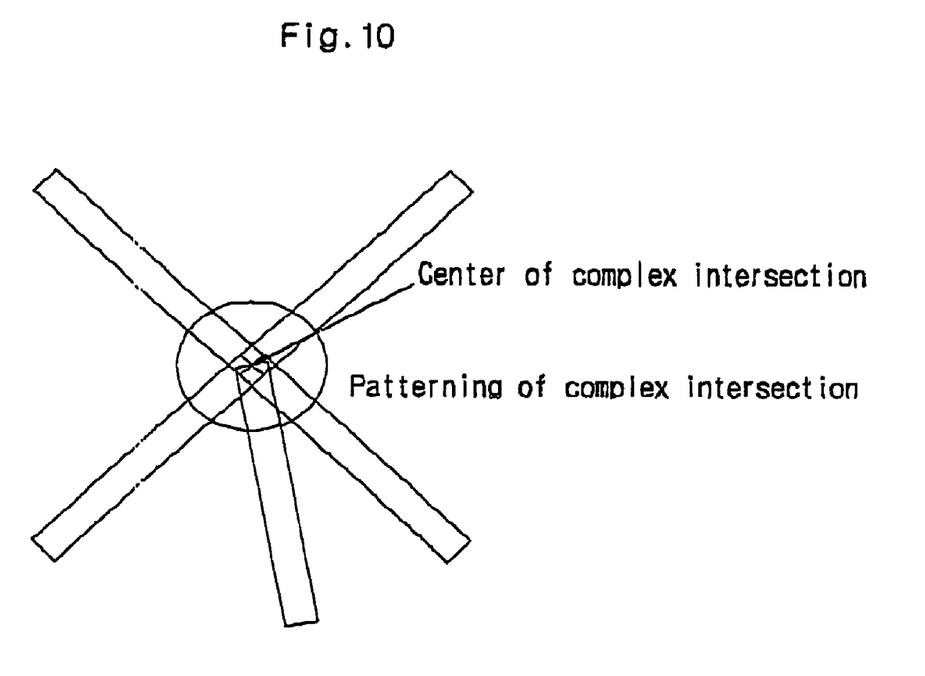
FIG. 10 is an exemplary view schematically showing a reconstruction of a complex intersection by using a complex intersection data according to the present invention.

FIG. 10 is an exemplary view schematically showing a reconstruction of a complex intersection by using a complex intersection data according to the present invention. As shown in FIG. 10, the complex intersection data to be provided to the user can be reconstructed by configuring the complex intersection through the grouping process and patterning the configured complex intersection.

The complex intersection data generated according to the complex intersection reconstructing method of the present invention is constructed as shown in FIG. 2 and previously included as an attribute in the navigation numeric map.

Then, a drive map matching and path following are performed from an intersection entry time point to an intersection exit time point on the basis of the reconstructed data (S404). By doing so, a path departure judgment is performed through the drive map matching and path following.

The followed path guiding information is provided to the user on a screen and by a voice. The screen provided to the user returns to the path guiding drive screen after passing the guided place.

As described above, according to the vehicle navigation system and method for guiding the path of the complex intersection, it is possible to guide the path more accurately by reconfiguring a display of the complex intersection which cannot be represented with one node on the navigation numeric map.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A vehicle navigation method for guiding path of a complex intersection, comprising:
    generating a node and a link sequence from a path searching data;
    extracting a terminal sharing node and link by comparing the node and link sequence with a map data for terminal;
    reconstructing a path guidance data of the complex intersection by performing a grouping using the extracted sharing node and link of the complex intersection, and by patterning the grouped complex intersection;
    performing a map matching and a path following in a drive state on the basis of the reconstructed data; and
    providing the followed path guidance information,
    wherein a complex intersection is an intersection having a plurality of nodes.

2. The vehicle navigation method of claim 1, wherein the path searching data is provided from at least one of an external server and a self-system.

3. The vehicle navigation method of claim 1, wherein the reconstruction of the path guidance data is carried out by reconstructing a node and a link data of the complex intersection.

4. The vehicle navigation method of claim 1, wherein the grouping comprises:
    defining a complex intersection configuration node of a navigation numeric map;
    grouping the extracted sharing node by using the defined intersection name attribute; and
    if a connectivity between the grouped nodes is secured, judging the complex intersection as a nodeset.

5. The vehicle navigation method of claim 4, wherein each node of the complex intersection has the same name.

6. The vehicle navigation method of claim 1, wherein performing the grouping by using the link of the complex intersection comprises:
    defining a complex intersection configuration link of a navigation numeric map;
    grouping the extracted link by using a defined intra-intersection link attribution; and
    judging a link, which is not the intra-intersection link among the grouped links, as a connection link.

7. The vehicle navigation method of claim 1, wherein patterning the grouped complex intersection comprises:
    indexing nodes of the grouped complex intersection;
    extracting a connection angle of a connection link coupled in a progressing direction of the indexed node;
    integrating the complex intersection connection links by using the extracted connection angle; and
    adding a special intersection attribute to the integrated complex intersection.

8. The vehicle navigation method of claim 1, wherein the path guidance information is provided by at least one of on a screen and by a voice.

9. A vehicle navigation apparatus for guiding path of complex intersection, comprising:
    means for generating a node and a link sequence from a path searching data;
    means for extracting a terminal sharing node and link by comparing the node and link sequence with a map for terminal;

means for reconstructing a path guidance data of the complex intersection based on the extracted sharing node and link, wherein the means for reconstructing the path guidance data comprises means for performing a grouping by using the sharing node and link of the complex intersection, and means for patterning the grouped complex intersection;

means for performing a map matching and a path following during a drive state on the basis of the reconstructed data; and means for providing the followed path guidance information to a user, wherein a complex intersection is an intersection having a plurality of nodes.

10. The vehicle navigation apparatus of claim 9, wherein the path searching data is provided from at least one of an external server and a self-system.

11. The vehicle navigation apparatus of claim 9, wherein the reconstruction of the path guidance data is carried out by reconstructing a node and a link data of the complex intersection.

12. The vehicle navigation apparatus of claim 9, wherein the means for performing the grouping comprises:

means for grouping the extracted sharing node by using a defined intersection name attribute; and means for judging the complex intersection as a nodeset if a connectivity between the grouped nodes is secured.

13. The vehicle navigation apparatus of claim 12, wherein each node of the complex intersection has the same name.

14. The vehicle navigation apparatus of claim 9, wherein the means for performing the grouping comprises:

means for grouping the extracted link by using a defined intra-intersection link attribution; and means for judging a link, which is not the intra-intersection link among the grouped links, as a connection link.

15. The vehicle navigation apparatus of claim 9, wherein the means for patterning the grouped complex intersection comprises:

means for indexing nodes of the grouped complex intersection;

means for extracting a connection angle of a connection link coupled in a progressing direction of the indexed node;

means for integrating the complex intersection connection links by using the extracted connection angle; and means for adding a special intersection attribution to the integrated complex intersection.

\* \* \* \* \*